United States Patent
Kim

(10) Patent No.: US 6,835,165 B2
(45) Date of Patent: Dec. 28, 2004

(54) 2-3 UP-SHIFTING SHIFT CONTROL DEVICE AND METHOD FOR AN AUTOMATIC TRANSMISSION OF A VEHICLE CROSS-REFERENCE TO RELATED APPLICATION

(75) Inventor: Joung-Chul Kim, Kyungki-Do (KR)

(73) Assignee: Hyundai Motor Company, Seoul (KR)

( * ) Notice: Subject to any disclaimer, the term of this patent is extended or adjusted under 35 U.S.C. 154(b) by 2 days.

(21) Appl. No.: 10/336,749

(22) Filed: Jan. 6, 2003

(65) Prior Publication Data

US 2003/0144113 A1 Jul. 31, 2003

Related U.S. Application Data

(63) Continuation-in-part of application No. 09/978,693, filed on Oct. 18, 2001, now abandoned.

(30) Foreign Application Priority Data

Oct. 18, 2000 (KR) .......................................... 2000-61221

(51) Int. Cl.[7] .............................................. F16H 61/00
(52) U.S. Cl. ........................................ 477/160; 477/162
(58) Field of Search ................................ 477/156, 160, 477/161, 158, 159, 162

(56) References Cited

U.S. PATENT DOCUMENTS

| 5,311,795 | A | * | 5/1994 | Yoshimura et al. ......... 477/161 |
| 5,501,642 | A | | 3/1996 | Inuzuka et al. |
| 5,882,278 | A | | 3/1999 | Takiguchi et al. |
| 5,980,426 | A | * | 11/1999 | Kamada et al. ............. 477/156 |
| 6,190,286 | B1 | | 2/2001 | Ito et al. |
| 6,390,949 | B1 | * | 5/2002 | Kondo et al. ............... 477/154 |

* cited by examiner

Primary Examiner—Saul Rodriquez
Assistant Examiner—Dennis J. Abdelnour
(74) Attorney, Agent, or Firm—Birch, Stewart, Kolasch & Birch, LLP

(57) ABSTRACT

In order to reduce shift shock in shifting from a 2 driving range to a 3 driving range and improve the endurance of an automatic transmission, a 2–3 up-shifting shift control device of an automatic transmission of the present invention is provided, comprising a vehicle speed sensor, a shift lever position sensor, a throttle position sensor, a shift control unit, and a shift drive unit performing a predetermined 2–3 upshifting drive control operation by controlling hydraulic pressures in response to the sensors.

3 Claims, 2 Drawing Sheets

2-3 UP-SHIFTING SHIFT CONTROL DEVICE AND METHOD FOR AN AUTOMATIC TRANSMISSION OF A VEHICLE CROSS-REFERENCE TO RELATED APPLICATION

This application is a continuation-in-part of application Ser. No. 09/978,693 filed on Oct. 18, 2001, now abandoned the entire contents of which are hereby incorporated by reference.

BACKGROUND OF THE INVENTION

1. Field of the Invention

The present invention relates to an automatic transmission of a vehicle. More particularly, the present invention relates to a 2–3 up-shifting shift control device of an automatic transmission of a vehicle, and a method thereof.

2. Description of the Related Art

Generally, in an automatic transmission used for a vehicle, a shift control system performs control to realize automatic shifting into different speeds and shift ranges according to various factors including throttle valve opening, vehicle speed and load, and several other engine and driving conditions sensed through a plurality of sensors. That is, based on such factors, the shift control device controls a plurality of solenoid valves of a hydraulic control device such that hydraulic flow in the hydraulic control device is controlled, resulting in shifting of the transmission into the various speeds and shift ranges.

In more detail, when the driver manipulates a shift lever to a particular shift range, a manual valve of the hydraulic control device undergoes port conversion as a result of the manual valve being indexed with the shift lever. By this operation, hydraulic pressure supplied from a hydraulic pump selectively engages a plurality of friction elements of a gearshift mechanism according to the duty control of the solenoid valves, thereby realizing shifting into the desired shift range.

In such an automatic transmission, shift quality is determined by how smoothly the friction elements are engaged and disengaged. Namely, when changing shift ranges, the timing between the engagement of a specific set of friction elements and the disengagement of another specific set of friction elements determines the shift quality of the automatic transmission. Accordingly, there have been ongoing efforts to develop improved shift control methods that enhance shift quality by better controlling the timing of friction elements to engaged and disengaged states.

In the automatic transmission described above, shift control is performed for up-shifting from the first forward speed to the fourth forward speed in turn, down-shifting from the fourth forward speed to the first forward speed in turn and down-skip shifting 4–2 or 3–1, according to the driving condition of a vehicle.

The 2–3 up-shifting shift control of the prior art performs shifting from the 2 driving range into the 3 driving range according to driving speed (output shaft rpm). In such a 2–3up-shifting shift of the prior art, a combination of only two intermediate solenoid valves is applied during the entire shift in order to ensure hydraulic control and shift quality maintenance during the shifting.

Accordingly, the degrees of freedom of hydraulic control are minimal when applying the combination of just two intermediate solenoid valves in 2–3 up-shifting, and the hydraulic control and shift quality maintenance is difficult to ensure without taking into account throttle valve opening. In addition, shift shock from interlocking frequently occurs.

SUMMARY OF THE INVENTION

It is an object of the present invention to provide a 2–3 up-shifting shift control device of an automatic transmission of a vehicle and a method thereof to reduce shift shock in shifting from a 2 driving range to a 3 driving range, and to improve the endurance of an automatic transmission.

To achieve the above object, the present invention provides a 2–3 up-shifting shift control device of an automatic transmission, comprising a vehicle speed sensor sensing a vehicle speed, a shift lever position sensor sensing a shift lever position of the vehicle, a throttle position sensor sensing a throttle valve opening of the vehicle, a shift control unit outputting a 2–3 up-shifting drive control signal corresponding to the sensed throttle valve opening when the shift lever position is changed from a 2 driving range to a 3 driving range and the vehicle is driving, and a shift drive unit performing a predetermined 2–3 up-shifting drive control operation by controlling hydraulic pressures in response to the control signal received from the shift control unit.

To achieve the above objective, the present invention provides a shift control method of an automatic transmission comprising the steps of sensing the vehicle speed, sensing the shift lever position of the vehicle, sensing the throttle valve opening of the vehicle, determining a shift control condition corresponding to the sensed throttle valve opening when the shift lever position is changed from the 2 driving range to the 3 driving range and the vehicle is driving, and performing the 2–3 up-shifting control operation according to the determined shift control conditions.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A preferred embodiment of the present invention will hereinafter be described in detail with reference to the accompanying drawings. While this invention is described in connection with what is presently considered to be the most practical and preferred embodiment, it is to be understood that the invention is not limited to the disclosed embodiments, but, on the contrary, is intended to cover various modifications and equivalent arrangements included within the sprit and scope of the appended claims.

Figure 1:
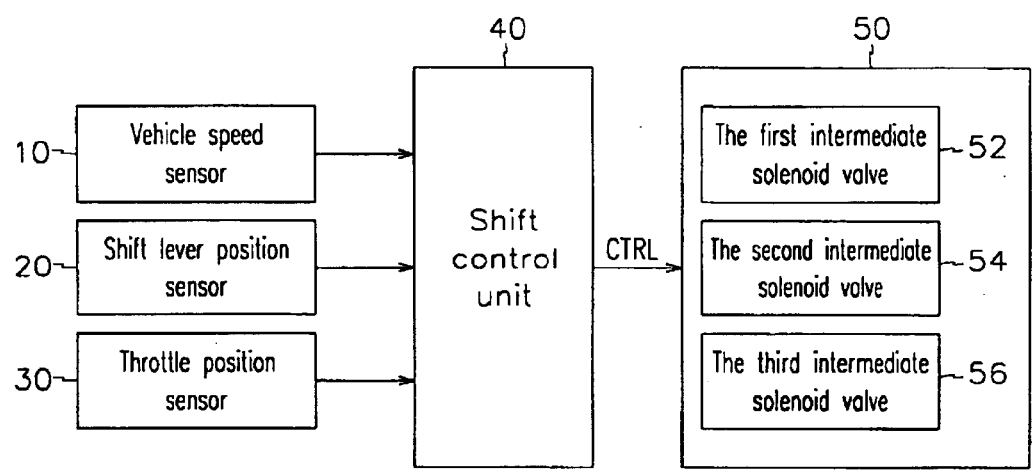
FIG. 1 is a block diagram of a 2–3 up-shifting shift control device of an automatic transmission according to a preferred embodiment of the present invention.

FIG. 1 is a block diagram of a 2–3 up-shifting shift control device of an automatic transmission according to a preferred embodiment of the present invention.

As shown in FIG. 1, a 2–3 up-shifting shift control device of an automatic transmission according to the present invention comprises a vehicle speed sensor 10 sensing the vehicle speed, a shift lever position sensor 20 sensing the shift lever position of the vehicle, a throttle position sensor 30 sensing the throttle valve opening (TVO) of the vehicle, a shift control unit 40 outputting a 2–3 up-shifting drive control signal on condition of the shift control based on the sensed throttle valve opening when the shift lever position is changed from a 2 driving range to a 3 driving range and the vehicle is driving, and a shift drive unit 50 performing the predetermined shift control operation by controlling the hydraulic pressure when it receives a 2–3 up-shifting drive control signal from the shift control unit 40.

The shift drive unit 50 comprises a first intermediate solenoid valve 52 and a second intermediate solenoid valve 54 controlling a flow of hydraulic pressure when being controlled to do so by the 2–3 up-shifting drive control signal (duty control signal) received from the shift control unit 40, and a third intermediate solenoid valve 56 being controlled to an on/off state to control a flow of hydraulic pressure according to the on/off signal received from the shift control unit 40.

Byte values of a 2–3 up-shifting shift control logic code (2, 1, 3, 6, 3, 5, 2, 0, 5, 3, 6, 8, 4, 0, 5, 1) for a preferred embodiment of the present invention will hereinafter be described in detail.

Most importantly, the value 2 of the first byte is a value to check the selection condition of the intermediate solenoid valve combination according to the shift control condition corresponding to the throttle valve opening. The selection condition of the intermediate solenoid valve combination is divided into a first condition and a second condition, where the first condition is set as the condition corresponding to a case when the throttle valve opening (TVO) is less than a predetermined throttle valve opening value, and the second condition is set as the condition corresponding to a case when the throttle valve opening (TVO) is not less than the predetermined throttle valve opening (TVO) value.

The value 1 of second byte is a value for checking the interrupt condition. The interrupt condition concerns turbine speed and throttle valve opening, allowing interruption when a turbine revolution speed is greater than a determined turbine revolution speed, for example 992 rpm (revolutions per minute) and a throttle valve opening is below a determined throttle valve opening value, for example 2.7%.

The value 3 of the third byte is a value for representing output of combinations of three intermediate solenoid valves, and for controlling performance of the fourth byte to the ninth byte under the first condition.

The values of the fourth to the ninth bytes are values for representing the output and maintaining time of first, second, and third combinations of the first, the second and the third intermediate solenoid valves 52, 54 and 56 under the first condition.

The values 6 and 3 of the fourth and the fifth bytes respectively represent a first code for the first intermediate solenoid valve combination under the first condition and maintaining time for the first intermediate solenoid valve combination under the first condition. The values 5 and 2 of the sixth and the seventh bytes respectively represent a second code for the second intermediate solenoid valve combination under the first condition and maintaining time for the second intermediate solenoid valve combination under the first condition. The values 0 and 5 of the eighth and the ninth bytes respectively represent a third code for the third intermediate solenoid valve combination under the first condition and maintaining time for the third intermediate solenoid valve combination under the first condition.

During 2–3 up-shifting control under the first condition, the shift control unit 40 outputs consecutive signals corresponding to the first, second, and third combination.

The first, second, and third combination of solenoid valves under the first condition can be obviously set corresponding to an automatic transmission by a person skilled in the art, and the codes for the first, second, and third combination may be set arbitrarily by the same.

The value 3 of the tenth byte is a value for representing output of combinations of three intermediate solenoid valves, and for controlling performance of the eleventh byte to the sixteenth byte under the second condition.

The values of the eleventh to the sixteenth bytes are value for representing the output and maintaining time of first, second, and third combinations of the first, the second and the third intermediate solenoid valve 52, 54 and 56 under the second condition.

The values 6 and 8 of the eleventh and the twelfth bytes respectively represent a first code for the first intermediate solenoid valve combination under the second condition and maintaining time for the first intermediate solenoid valve combination under the second condition. The values 4 and 0 of the thirteenth and the fourteenth bytes respectively represent a second code for the second intermediate solenoid valve combination under the second condition and maintaining time for the second intermediate solenoid valve combination under the second condition. The values 5 and 1 of the fifteenth and sixteenth bytes respectively represent a third code for the third intermediate solenoid valve combination under the second condition and maintaining time for the third intermediate solenoid valve combination under the second condition.

During 2–3 up-shifting control under the first condition, the shift control unit 40 outputs consecutive signals corresponding to the first, second, and third combination.

The first, second, and third combination of solenoid valves under the first condition can be obviously set corresponding to an automatic transmission by a person skilled in the art, and the codes for the first, second, and third combination may be set arbitrarily by the same.

The present invention performs 2–3 up-shifting shift control by using combinations of the three intermediate solenoid valves 52, 54, 56 and by dividing the region of the throttle valve opening into a low opening region (the first condition) and a high opening region (the second condition).

As shown above, three intermediate combinations of the valves 52, 54, and 56 are employed for each of the first and the second conditions.

Figure 2:
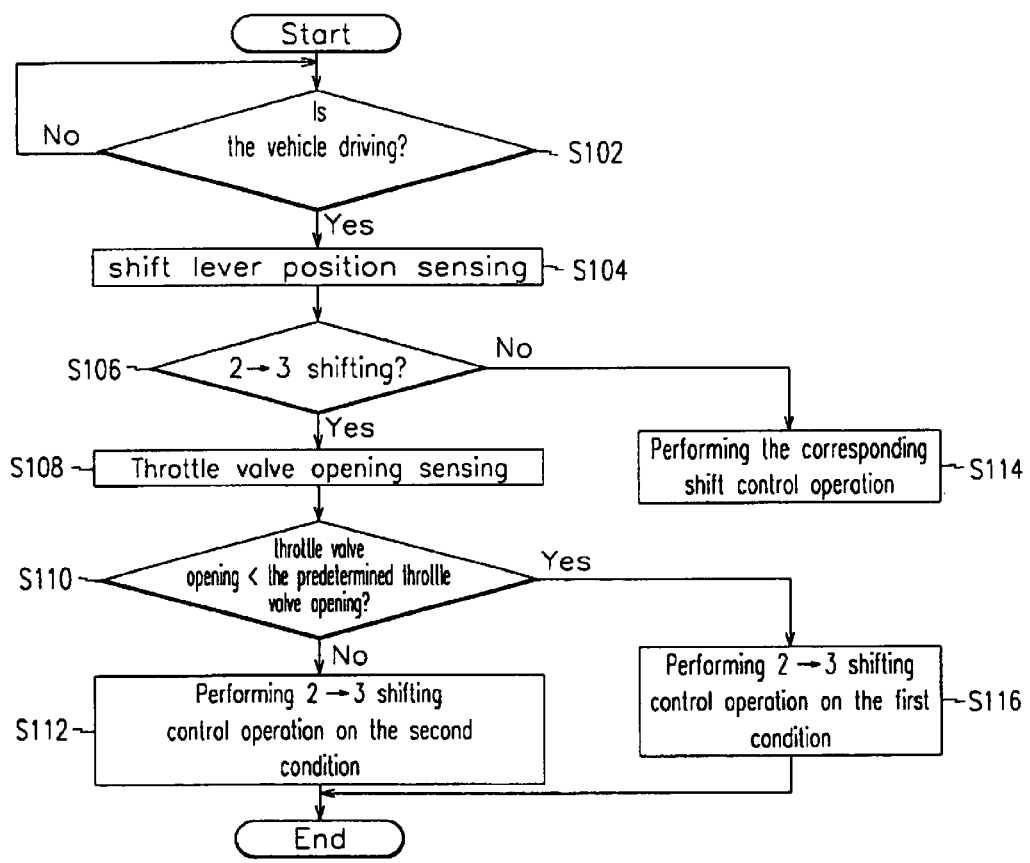
FIG. 2 is a flowchart showing an operation of a 2–3 up-shifting shift control method of an automatic transmission according to a preferred embodiment of the present invention.

FIG. 2 is a flowchart showing an operation of a 2–3 up-shifting shift control method of an automatic transmission according to a preferred embodiment of the present invention. Referring to FIG. 1 and FIG. 2, the method will be described in detail.

The shift control unit 40 senses the vehicle speed by way of the vehicle speed sensor at step 102 of FIG. 2, and when the vehicle is found to be driving it proceeds to step 104, wherein the shift lever position is sensed. When the shift lever is determined to have moved from a 2 driving range to a 3 driving range in step 106, the throttle valve opening is sensed in step 108, and if the throttle valve opening value is not less than the predetermined throttle valve opening value in step 110, the shift control unit 40 supplies the 2–3 up-shifting shift drive control signal corresponding to the second condition to the shift drive unit 50, which performs 2–3 up-shifting shift control.

Also, the shift control unit 40 proceeds to step 114 when the sensed shift lever at step 106 described above is not moved from the 2 driving range to the 3 driving range, and it performs whichever other shift control operation that is appropriate at this step. Moreover, the shift control unit 40 proceeds to step 116 when the sensed throttle valve opening value at step 110 described above is less than the predetermined throttle valve opening value, and outputs the 2–3 up-shifting shift drive control signal corresponding to the first condition to the shift drive unit 50, which then performs the 2–3 up-shifting shift control operation corresponding to the first condition.

As described above, the 2–3 up-shifting shift control device and method of the present invention comprises one more degree of freedom of control of the intermediate solenoid valves in 2–3 up-shifting compared with the prior art, through dividing the region of throttle valve opening during shifting into a low opening region and a high opening region. This results in smoother shifting under multiple conditions during 2–3 up-shifting, thereby reducing shift shock and increasing automatic transmission endurance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A 2–3 up-shifting shift control device of an automatic transmission of a vehicle, comprising:

a vehicle speed sensor sensing a vehicle speed;

a shift lever position sensor sensing a shift lever position of the vehicle;

a throttle position sensor sensing a throttle valve opening value of the vehicle;

a shift control unit outputting a 2–3 up-shifting drive control signal corresponding to the sensed throttle valve opening (TVO) value when the shift lever position is changed from a 2 driving range to a 3 driving range and the vehicle is driving; and a shift drive unit performing a predetermined 2–3 upshifting drive control operation by controlling hydraulic pressures in response to the control signal received from the shift control unit, the shift drive unit comprising intermediate solenoid valves;

wherein said 2–3 up-shifting drive control signal comprises signals for first, second, and third combinations of the intermediate solenoid valves, wherein said first, second and third combinations are determined based on a shift control condition corresponding to the throttle valve opening (TVO), and wherein each of said signals for first, second, and third combinations of intermediate solenoid valves comprises a code for the corresponding combination and a code for maintaining time of the corresponding combination.

2. The device of claim 1, wherein said shift control condition corresponding to the throttle valve opening (TVO) value is a first condition corresponding to when the throttle valve opening (TVO) value is less than a predetermined throttle valve opening value during 2–3 up-shifting, or a second condition corresponding to when the throttle valve opening (TVO) value is not less than the predetermined throttle valve opening value during 2–3 up-shifting.

3. A shift control method of an automatic transmission of a vehicle comprising:

sensing a vehicle speed;

sensing a shift lever position of a vehicle;

sensing a throttle valve opening value of the vehicle;

determining a shift control condition corresponding to the sensed throttle valve opening (TVO) value when the shift lever position is changed from a 2 driving range to a 3 driving range and the vehicle is driving, and performing a 2–3 up-shifting control operation, using intermediate solenoid valves, according to the determined shift control condition, wherein said performing a 2–3 up-shifting control utilizes a 2–3 up-shift drive control signal comprising signals for first, second, and third combinations of the intermediate solenoid valves, wherein said first, second and third combinations are determined based on a shift control condition corresponding to the throttle valve opening (TVO), and wherein each of said signals for first, second, and third combinations of intermediate solenoid valves comprises a code for the corresponding combination and a code for maintaining time of the corresponding combination.

* * * * *